(12) United States Patent
Friebe et al.

(10) Patent No.: US 8,278,892 B2
(45) Date of Patent: Oct. 2, 2012

(54) CONVERTER COMPRISING AT LEAST ONE NORMALLY ON SEMICONDUCTOR SWITCH

(75) Inventors: Jens Friebe, Vellmar (DE); Oliver Prior, Marsberg (DE)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 13/070,769

(22) Filed: Mar. 24, 2011

(65) Prior Publication Data

US 2011/0199792 A1 Aug. 18, 2011

Related U.S. Application Data

(63) Continuation-in-part of application No. PCT/EP2009/062402, filed on Sep. 24, 2009.

(30) Foreign Application Priority Data

Sep. 24, 2008 (DE) .......................... 10 2008 042 339

(51) Int. Cl.
*G05F 1/40* (2006.01)
*H02M 7/5387* (2007.01)

(52) U.S. Cl. ......... 323/271; 363/132; 323/284; 323/351
(58) Field of Classification Search .................. 323/271, 323/282, 284, 351; 363/131–134
See application file for complete search history.

(56) References Cited

U.S. PATENT DOCUMENTS

| 7,265,525 B2* | 9/2007 | Xu et al. | ......................... 323/271 |
| 7,307,407 B2* | 12/2007 | Nishi et al. | ..................... 323/350 |
| 7,902,809 B2* | 3/2011 | Briere et al. | ................... 323/351 |
| 2004/0004404 A1 | 1/2004 | Eckardt et al. | |
| 2005/0286281 A1 | 12/2005 | Victor et al. | |
| 2011/0080156 A1* | 4/2011 | Briere et al. | ................... 323/351 |

FOREIGN PATENT DOCUMENTS

| DE | 102004030912 B3 | 1/2006 |
| DE | 102006029928 B3 | 9/2007 |
| EP | 1928077 A2 | 6/2008 |
| EP | 2006991 A1 | 12/2008 |
| JP | 2007159364 A | 6/2007 |

OTHER PUBLICATIONS

International Preliminary Report on Patentability dated Mar. 29, 2011 in connection with PCT Patent Application No. PCT/EP2009/062402, p. 1-11.
International Search Report dated Feb. 26, 2010 in connection with PCT Patent Application No. PCT/EP2009/062402, p. 1-6.
Press Release No. 02/08 by Fraunhofer-Institut for Solare Energiesysteme ISE dated Jan. 15, 2008, p. 1-3.

* cited by examiner

*Primary Examiner* — Jessica Han
(74) *Attorney, Agent, or Firm* — Eschweiler & Associates, LLC

(57) ABSTRACT

A converter for converting a DC input voltage includes two input lines receiving the DC input voltage; at least one normally off semiconductor switch which is not conductive without application of a control voltage to its gate and which is provided in one of the input lines. The converter also includes electric circuitry connected between the input lines and including at least one normally on semiconductor switch which is conductive without application of a control voltage to its gate; and a controller. In operation of the converter, the controller operates the at least one normally on semiconductor switch of the electric circuitry by temporarily applying a first control voltage to its gate; and permanently applies a second control voltage to the gate of the at least one normally off semiconductor switch in the one input line. Any normally on semiconductor switch of the electric circuitry is spatially separated and thus thermally isolated from any normally off semiconductor switch.

45 Claims, 9 Drawing Sheets

CONVERTER COMPRISING AT LEAST ONE NORMALLY ON SEMICONDUCTOR SWITCH

CROSS REFERENCE TO RELATED APPLICATIONS

This application is a continuation-in-part of International Application PCT/EP2009/062402 with an International Filing Date of Sep. 24, 2009 and claiming priority to German Patent Application No. 10 2008 042 339.4 entitled "Wandler mit mindestens einem selbstleitenden Schalter", filed on Sep. 24, 2008.

TECHNICAL FIELD

The invention relates to a converter for converting a DC voltage applied between two input lines, the converter comprising two input lines adapted to receive a DC input voltage; an electric circuitry connected to the input lines and including at least one semiconductor switch; and a controller which, in operation of the converter, operates the at least one semiconductor switch of the electric circuitry by temporarily applying a control voltage to its gate.

BACKGROUND

An inverter comprising a H-shaped inverter bridge made of semiconductor switches and connected between two input lines and a controller controlling the semiconductor switches in operation of the inverter is, for example, known from US Patent Application Publication US 2005/0286281 A1 (corresponding to German Patent DE 10 2004 030 912 B3). Here, the semiconductor switches are MOSFETs, i.e. metal oxide semiconductor field effect transistors. Such field effect transistors are of the normally off-type, i.e. without applying control voltages to their gates they are not conductive. This is an advantage in so far as the entire inverter bridge is not conductive as long as no control voltages are present yet, and as soon as any control voltages are no longer present. Thus, the normally not conductive inverter bridge avoids a short circuit both between the input lines and between AC output lines at any time at which the controller is not available.

In the particular inverter known from US 2005/0286281 A1, an additional semiconductor switch which also is a MOSFET is provided in one of the input lines. This additional semiconductor switch in the one input line and the semiconductor switches of the inverter bridge which are connected to the other input line are operated by the controller at a higher frequency, whereas the two other semiconductor switches of the inverter bridge which are connected to the one input line are operated by the controller at a lower frequency. This lower frequency corresponds to the frequency of the AC voltage output by the inverter, whereas the higher frequency is used for shaping the output AC current by means of pulse width modulation. In the inverter known from US 2005/0286281 A1 all semiconductor switches being MOSFETs are provided with anti-parallel diodes.

A press release No. 02/08 by Fraunhofer-Institut für Solare Energiesysteme ISE dated Jan. 15, 2008 (http://www.ise.fh-g.de/presse-und-medien/presseinformationen-pdf/0208_ISE_Pl_d_Rekord_Wechselrichterwirkungsgrad.pdf) reports a record efficiency of an inverter. MOSFETs on the basis of the semiconductor material silicone carbide (SiC) are reported to have been used in this inverter. SiC semiconductor parts are known both to have good electric properties like low conducting and switching losses and to be suitable for use in a much greater temperature range than common silicon semiconductor parts, i.e. up to 600° C. MOSFETs on the basis of SiC, however, are not generally available at present. Thus, they can not be widely used in inverters to raise the temperature limit posed by common silicon semiconductor parts.

Junction-gate field effect transistors (JFETs) on a SiC basis, however, are available on acceptable terms. JFETs, however, are principally semiconductor switches of the normally on-type, i.e. they are conductive without control voltages being applied to their gates. To compensate for this disadvantage, a so-called cascode is known in which a JFET is combined with a MOSFET and in which an input voltage is branched to the gate of the JFET and, via the MOSFET, to the source of the JFET. In the cascode, the JFET is indirectly switched or operated by controlling the gate of the MOSFET. It is an advantage of the cascode that it makes use of the high blocking capability of the SiC JFET and that the MOSFET only needs to have a small blocking voltage resistance. However, the power current through the cascade also flows through the MOSFET which essentially influences the switching properties of the entire cascade so that a cascode bears nearly all disadvantages of a MOSFET as compared to a JFET.

In an inverter known from EP 2 006 991 A1, normally on semiconductor switches of an inverter bridge are each provided in a cascade. As explained above, the advantages of a JFET may only be exploited to a limited extent in a cascade. Particularly, no use can be made of the high temperature resistance of a JFET on a SiC basis due to the low temperature resistance of the MOSFET arranged in close proximity to the JFET in the cascade. Further, the total number of semiconductor switches is twice as high as normally required when using cascodes as switches of an inverter bridge, each cascode comprising one JFET and one MOSFET.

An electronic switching device having at least two semiconductor switching elements, one of which is a normally on semiconductor switch, the other of which is a normally off semiconductor switch and which are connected together in series, is known from DE 10 2006 029 928 B3. Here, the switching device has two load contacts leading to the series connection and two control contacts for operating the two semiconductor switches by a controller. The controller may thus operate the normally on semiconductor switch by temporarily applying a control voltage to its gate whereas it continuously keeps the normally off semiconductor switch conductive by permanently applying a control voltage to its gate. Thus, it is possible to make use of the advantageous switching properties of the normally on semiconductor switch. Further, this known switching device comprises a decoupling means which only decouples both semiconductor switches, when the controller in fact controls the normally on semiconductor switch. Prior to and after that, both semiconductor switches are coupled in the same way as in a cascade.

There still is a need for a converter which, to a further extent, makes use of the advantages of semiconductor switches on SiC basis which are available at low cost.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a converter for converting a DC input voltage, which comprises two input lines adapted to receive the DC input voltage, and at least one normally off semiconductor switch which is not conductive without application of a control voltage to its gate and which is provided in one of the input lines. The converter also comprises electric circuitry connected to the input lines and including at least one normally on semiconductor switch which is conductive without application of a control voltage to its gate; and a controller. In operation of the converter, the controller operates the at least one normally on semiconductor switch of the electric circuitry by temporarily applying a control voltage to its gate; and controls the at least one normally off semiconductor switch in the one input line by applying a control voltage to its gate without operating it under load. Any normally on semiconductor switch of the electric circuitry which, in operation of the converter, is operated by the controller by temporarily applying a control voltage to its gate is spatially separated and thus thermally isolated from any normally off semiconductor switch of the converter.

The present invention also relates to a converter for converting a DC input voltage, which comprises two input lines adapted to receive the DC input voltage, and at least one normally off semiconductor switch which is not conductive without application of a control voltage to its gate and which is provided in one of the input lines. The converter also comprises electric circuitry connected to the input lines and including at least one normally on semiconductor switch which is conductive without application of a control voltage to its gate; and a controller. In operation of the converter, the controller operates the at least one normally on semiconductor switch of the electric circuitry by temporarily applying a control voltage to its gate; and permanently applies a control voltage to the gate of the at least one normally off semiconductor switch in the one input line. The one input line in which the at least one normally off semiconductor switch is provided branches at a point between the at least one normally off semiconductor switch in the one input line and the at least one normally on semiconductor switch of the electric circuitry. A buffer capacitor is connected between the input lines upstream of the at least one normally off semiconductor switch in the one input line; and a further capacitor is connected between the input lines downstream of the at least one normally off semiconductor switch and upstream of the point at which the one input line branches.

The present invention also relates to a converter for converting a DC input voltage, which comprises two input lines adapted to receive the DC input voltage, and at least one normally off semiconductor switch which is not conductive without application of a control voltage to its gate and which is provided in one of the input lines. The converter also comprises partial electric circuitry connected between the input lines and including at least one normally on semiconductor switch which is conductive without application of a control voltage to its gate; and a controller. In operation of the converter, the controller operates the at least one normally on semiconductor switch of the partial electric circuitry by temporarily applying a control voltage to its gate; and permanently applies a control voltage to the gate of the at least one normally off semiconductor switch in the one input line. The entire partial electric circuitry is normally conductive between the input lines without application of a control voltage to the gate of the at least one normally on semiconductor switch. A blocking potential line extends from the one input line upstream of the at least one normally off semiconductor switch to the gate of the normally on semiconductor switches of the partial circuit.

The present invention also relates to an inverter for converting a DC input voltage, which comprises two input lines adapted to receive the DC input voltage, and a normally conductive H-shaped inverter bridge comprising an AC output in a cross branch between two inverter half bridges. Each inverter half bridge includes two normally on semiconductor switches which are conductive without application of a control voltage to their gates, and two normally off semiconductor switches which are not conductive without application of a control voltage to their gates in a mirror-symmetric arrangement with regard to the AC output in the cross branch of the H-shaped inverter bridge. The converter also comprises a controller. In operation of the converter, the controller operates the normally on semiconductor switches of the inverter bridge by temporarily applying control voltages to their gates; and permanently applies control voltages to the gates of the two normally off semiconductor switches in the cross branch of the H-shaped inverter bridge.

The present invention also relates to a method of operating an inverter, wherein the converter comprises two input lines adapted to receive a DC input voltage and a normally conductive inverter bridge comprising at least one inverter half bridge including two normally on semiconductor switches which are conductive without application of a control voltage to their gates. The converter also comprises an AC output, for feeding electric energy from a photovoltaic DC power generator into an AC power grid. This method comprises connecting the photovoltaic DC power generator to the input lines; connecting the AC output to the AC power grid; and providing a normally off semiconductor switch which is not conductive without application of a control voltage to its gate in one of the input lines. The method also comprises providing two normally off semiconductor switches which are not conductive without application of a control voltage to their gates in a mirror-symmetric arrangement with regard to the AC output in the cross branch of the H-shaped inverter bridge. In addition, when the DC power generator supplies the DC input voltage, the method comprises feeding a controller with electric energy so that it operates the normally on semiconductor switches of the inverter bridge by temporarily applying control voltages to their gates, permanently applying a control voltage to the gate of the normally off semiconductor switch in the one input line, and permanently applying control voltages to the gates of the normally off semiconductor switch in the one input line and to the gates of the two normally off semiconductor switches in the cross branch of the H-shaped inverter bridge.

The converter may be a DC/DC converter, like for example a buck or boost converter.

Particularly, the converter may be a DC/AC converter which may also be referred to as an inverter and in which an inverter bridge may be connected between two input lines.

More particular, the present invention relates to an inverter for feeding electric energy from a DC voltage source into an AC grid. Even more particular the DC voltage source may be a photovoltaic DC power generator.

An inverter to which the present invention particularly relates may, however, also be used for other purposes in which the frequency of an output AC voltage may either be constant or variable to, for example, control the speed of an AC motor.

Further, an inverter according to the present invention may output a single-phase AC voltage or a multi-phase, particularly a three-phase AC voltage. When, in the following, a single-phase inverter is described, one should always consider that the same technical principles of the present invention may also be applied to a multi-phase inverter.

Any combination of a DC/AC converter according to the present invention with further electric or electronic units like, for example, an upstream boost converter, whether according to the present invention or not, which combination—as a whole—serves as an inverter is also possible.

In the following, both terms semiconductor switch of the normally off-type and normally off semiconductor switch refer to a semiconductor switch which is not conductive without application of a control voltage to its gate.

Correspondingly, both terms semiconductor switch of the normally on-type and normally on semiconductor switch refer to a semiconductor switch which is conductive without application of a control voltage to its gate.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
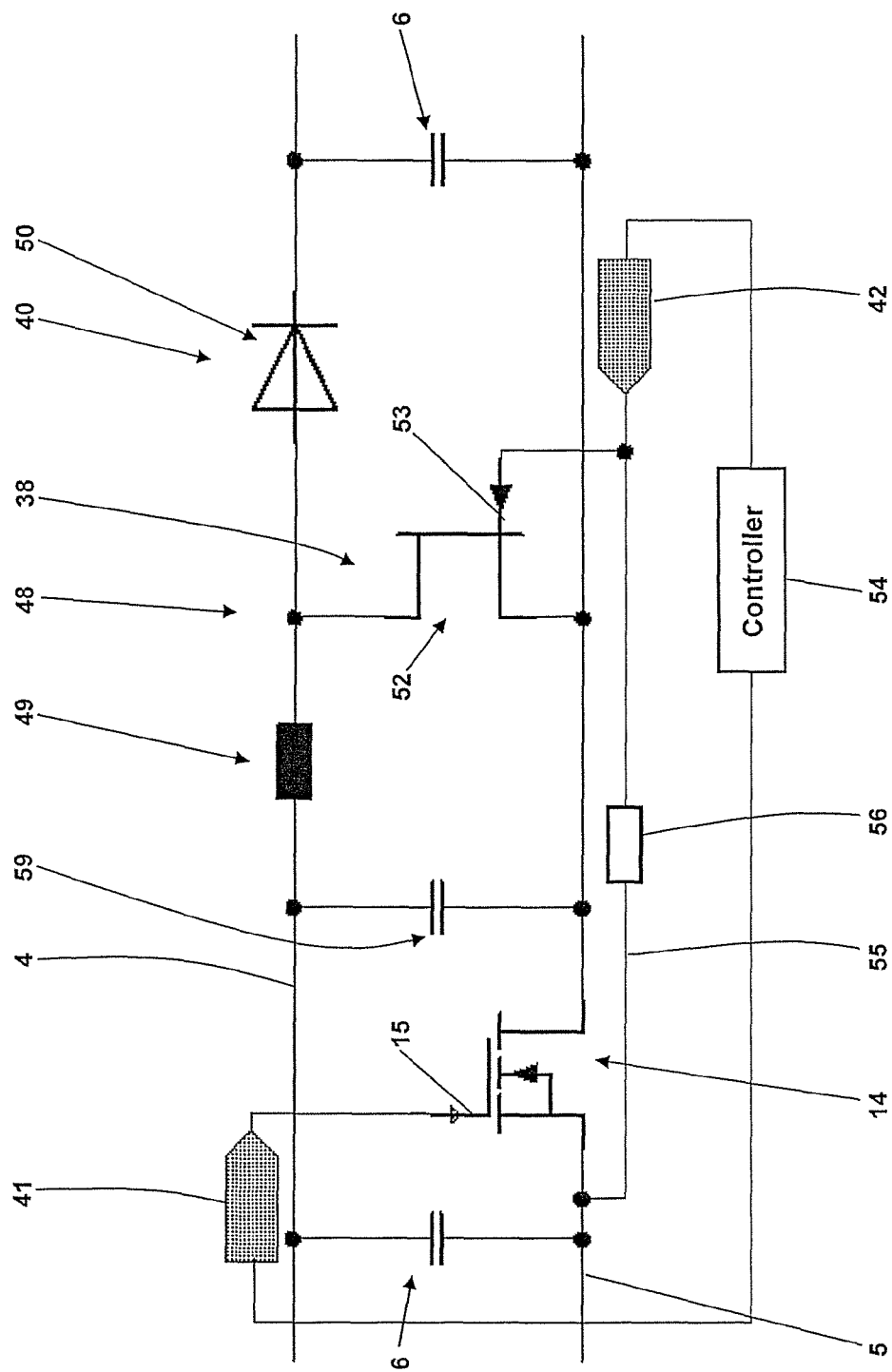
FIG. 1 shows a topology of a boost converter in which a semiconductor switch of the normally on-type is connected between two input lines, but which, as a whole, is nevertheless of the normally off-type with regard to an input voltage applied between the input lines.

In the converter of the present invention, the semiconductor switch of the normally on-type is not combined with a semiconductor switch of the normally off-type such that it is indirectly controlled via the semiconductor switch of the normally off-type like in case of a cascode. Instead, the controller of the converter of the present invention directly controls the semiconductor switch of the normally on-type by applying a control voltage directly to its gate. To avoid a permanent short circuit via the semiconductor switch of the normally on-type, when the control voltage is not yet available from the controller or when the controller breaks down, a semiconductor switch which is not conductive without application of a control voltage to its gate and which, in operation of the converter, is also controlled by the controller by applying a control voltage to its gate, is arranged in at least one of the input lines of the converter. This normally off semiconductor switch may have the disadvantages of known semiconductor switches of the normally off-type. However, the normally off semiconductor switch is only one of several semiconductor switches, if the electric circuitry of the converter comprises several semiconductor switches of the normally on-type. Further, in continuous operation of the converter, the normally off semiconductor switch is not repeatedly switched between its conductive and its not conductive state by intermittent application of the control voltage to its gate. At least, the normally off semiconductor switch is not switched under load in continuous operation of the converter so that it does not interfere with flowing currents. This implies that, in standard operation of the converter of the present invention, the control voltages applied to the gates of the semiconductor switches of the normally on- and of the normally off-type are not the same. Not only then, when the semiconductor switch of the normally off-type is permanently switched on, i.e. permanently kept in its conductive state, but also then, when it is not switched under load, i.e. when it does not interfere with flowing currents, there are no switching losses. Further, the semiconductor switches of the normally off-type may be completely optimized for minimizing its conducting losses. Even the higher temperature sensitivity of common semiconductor switches of the normally off-type as compared to certain semiconductor switches of the normally on-type has no imperative effect on the converter of the present invention as the semiconductor switch of the normally off-type may easily be arranged remote from every semiconductor switch of the normally on-type. Particularly, the normally off semiconductor switch is not combined in close proximity with any of the semiconductor switches of the normally on-type to form a compact switching device, and may thus without any further measures be arranged at a position spatially remote with regard to all pulsed semiconductor switches of the normally on-type which may become hot in operation of the converter. As the conductive state of the normally off semiconductor switch is not or at least not under load changed in the continuous operation of the converter, only little heat will be generated here, even with high powers transferred by the converter. As long as the control voltages from the controller of the converter are not yet present or as soon as the controller breaks down for any reason, the semiconductor switch of the normally off-type in the input line avoids a short circuit current between the input lines, which would otherwise flow through the no longer controlled and thus conductive semiconductor switch of the normally on-type. For this purpose of short circuit avoidance, only one semiconductor switch of the normally off-type is needed in contrast to, for example, four normally off semiconductor switches in an inverter bridge comprising four cascodes.

The separation of the normally off semiconductor switch from every normally on semiconductor switch of the electric circuitry between the input lines may alternatively or additionally to a spatial separation be characterized in that the input line in which the normally off semiconductor switch is provided branches between the normally off semiconductor switch and the normally on semiconductor switch. This branching of the input line means a branching of the power current path between the normally off semiconductor switch and the normally on semiconductor switch. The branch off the input line may, for example, lead to one or more further switches of the normally off-type or to a support capacitor connected between the input lines of the converter. The branching of the input line advantageously allows for arranging the semiconductor switch of the normally off-type outside any free-wheeling current path of the converter such that the current through the semiconductor switch of the normally off-type only flows in one direction.

As already indicated, the inverter of the present invention may comprise a normally conductive partial circuitry connected between the input lines and including the one or more semiconductor switches of the normally on-type. In one embodiment of the present invention, this partial circuitry is the main switch of a boost converter.

The converter of the present invention may be a DC/AC converter or inverter comprising a normally conductive inverter bridge made of semiconductor switches of the normally on-type. In such an inverter bridge, as a rule, two semiconductor switches of the normally on-type will be provided per so-called half bridge, i.e. two with a single half bridge and four with a so-called full bridge. One half of these semiconductor switches of the normally on-type will be connected to the one input line in which the normally off semiconductor switch is provided, whereas the other half of these semiconductor switches of the normally on-type will be connected to the other input line. It will be appreciated that one or more multi level inverter bridges having a higher number of the semiconductor switches per half bridge than two may also be incorporated in the converter of the present invention.

For the purpose of avoiding a short circuit between the input lines upon breakdown of the control voltages from the controller, the high blocking resistance of the normally on semiconductor switches of the electric circuitry between the input lines may also be used in that blocking potential lines lead from the one input line upstream of the semiconductor switch of the normally off-type to the gates of at least a subset of the semiconductor switches of the normally on-type. Due to the electric resistance of the not conductive semiconductor switch of the normally off-type, a blocking potential will be present at the gates of these semiconductor switches of the normally on-type, which switches them into their not conducting state. If the semiconductor switches of the subset whose gates are connected to the blocking potential lines have been properly selected, they will block the entire partial circuitry between the input lines, i.e. they will make it not conductive.

If the converter is a DC/AC converter or inverter, the blocking potential lines may, for example, lead to the gates of one semiconductor switch of the normally on-type per half bridge of the inverter bridge, all these semiconductor switches being connected to one and the same of the input lines.

If resistors are arranged in the blocking potential lines, the blocking potentials at the connected gates of the normally on semiconductor switches may easily be overridden by the controller in applying the control voltages to the gates, i.e. overwritten with the control voltages as soon as the semiconductor switch of the normally off-type has been closed or made conductive by the controller and as the blocking potentials essentially drop over the resistors in the blocking potential lines.

Alternatively or additionally, switching elements, particularly controllable semiconductor switches, may be arranged in the blocking potential lines. For example, these controllable semiconductor switches are further normally on semiconductor switches, and, in operation of the converter, the controller permanently applies control voltages to their gates to cut off the blocking potential from the gates to which the blocking potential lines are connected.

If the converter is a DC/AC converter or inverter, the controller may switch or operate a semiconductor switch in one of the input lines as well as the normally on semiconductor switches of the inverter bridge which are connected to the other input line at a higher frequency, whereas it switches or operates the normally on semiconductor switches of the inverter bridge which are connected to the other of the input lines at a lower frequency. The lower frequency may be the frequency of an AC voltage output by the inverter. This embodiment of the inverter is an application of principles known from US 2005/0286281 A1 which is incorporated herein by reference. Preferably, the semiconductor switch in the one of the input lines is an additional semiconductor switch of the normally on-type and not the semiconductor switch of the normally off-type which is already provided in one of the input lines. Generally, however, it is also possible to use the semiconductor switch of the normally off-type as the semiconductor switch in one of the input lines which is switched at high frequency. In this case, however, any blocking potential line extending from upstream of the normally off semiconductor switch has to be provided with a normally on semiconductor switch, and higher switching losses at the higher switching frequencies may be generated.

The measures described up to here have the goal to avoid a short circuit between the input lines, when the control voltages from the controller are not present at the gates of the semiconductor switches of the normally on-type of the partial circuitry between the input lines. These measures may be sufficient to avoid any short circuit current, if, for example, the inverter bridge of an inverter is only connected to a load which is operated with an AC voltage output by the inverter bridge. If, however, an external voltage, like for example that one of an alternating voltage grid, is permanently present at an AC output of the inverter bridge, it has also to be avoided that this external AC voltage is shorted via the normally conductive inverter bridge. For this purpose, two semiconductor switches of the normally off-type may be arranged in a mirror-symmetric arrangement with regard to the AC output in the cross branch of a H-shaped inverter bridge. Each of these two normally off semiconductor switches blocks currents flowing from the AC output in one direction. In operation of the inverter, these two further normally off semiconductor switches will also be operated, i.e. transferred into their conductive state, by the controller in that the controller applies permanent control voltages to their gates. Without these control voltages, the two further normally off semiconductor switches will block the AC output.

To make use of the high blocking capability of the semiconductor switches of the normally on-type in avoiding a short circuit of an external AC voltage via the normally conductive inverter bridge, two blocking potential lines may lead from each side of the AC output to the gates of one of two pairs of diagonally arranged semiconductor switches of the normally on-type of the inverter bridge. Thus, a total of four blocking potential lines extend from the cross branch of the inverter bridge between the two normally off semiconductor switches to the gates of all normally on semiconductor switches of the inverter bridge.

Resistors may be arranged in the blocking potential lines extending from the cross branch of the inverter bridge so that the blocking potentials remaining after closing the semiconductor switches of the normally off-type may easily be overridden by the controller in controlling the gates to which these potential lines are connected.

Alternatively or additionally, switching elements, particularly controllable semiconductor switches, may be arranged in these blocking potential lines. For example, these controllable semiconductor switches may be further normally on semiconductor switches. In operation of the converter, the controller permanently applies control voltages to the gates of the further normally on semiconductor switches to cut off the blocking potential from those gates to which the blocking potential lines are connected.

Additionally, blocking diodes may be arranged in those blocking potential lines extending from the AC output to any gate which is also connected to the one of the input lines via a blocking potential line. The blocking diodes avoid that currents flow via the blocking potential lines from the input line to the AC output or vice versa.

The topology of the converter of the present invention allows for using semiconductor switches of the normally on-type on a SiC basis for the partial circuitry between the input lines and for making maximum use of the known advantages of these SiC semiconductor switches. The SiC semiconductor switches of the normally on-type may be field effect transistors, particularly JFETs, which are available on a SiC basis at acceptable cost.

Besides one or more semiconductor switches of the normally on-type, the converter of the present invention comprises at least one semiconductor switch of the normally off-type. Full use of the high temperature resistance of the semiconductor switches of the normally on-type may be made, if all semiconductor switches of the normally off-type of the converter of the present invention are arranged at a distance to or remote from the semiconductor switches of the normally on-type, thereby creating a thermal isolation between the two different type switches. This also applies to any semiconductor switches of the normally off-type which are, for example, arranged in the cross branch of a H-shaped inverter bridge. It should be mentioned that all semiconductor switches of the normally off-type of the converter of the present invention are usually not pulsed or repeatedly switched into different conductive states in operation of the inverter of the present invention so that the heat generated in them is comparatively small as compared to the heat generated in the pulsed semiconductor switches of the normally on-type.

If the converter of the present invention is a DC/AC converter or inverter comprising a buffer capacitor connected between the input lines in parallel to the inverter bridge, this buffer capacitor is preferably connected between the input lines upstream of the semiconductor switch in the one input line. This has the effect that, by blocking the inverter bridge by means of the normally off semiconductor switch, it is avoided that the buffer capacitor is de-loaded via the inverter bridge in an uncontrolled way upon breakdown of the controller. Due to the spatial separation of the normally off semiconductor switch from the inverter bridge, however, the buffer capacitor may be quite far away from the inverter bridge. Thus, a further support capacitor may be connected between the input lines in parallel to and close to the inverter bridge. This support capacitor may be of a comparatively small capacitance. A capacitance of the support capacitor which is only one hundredth of the capacity of the buffer capacitor or even smaller will be sufficient. Such a small capacitance will only result in a limited thermal load to the semiconductor switches of the inverter bridge when de-loaded via a short circuit current through the inverter bridge. Such a support capacitor may also be provided in the embodiment of the converter of the present invention as a boost converter.

If the converter of the present invention is made as a DC/AC converter or inverter, at least one inductivity may be provided in the cross branch of its inverter bridge. Such an inductivity may also be arranged on both sides of the AC output provided here. This is a further measure generally known from US 2005/0286281 A1.

A DC/AC converter or inverter of the present invention is suitable for feeding electric energy from a DC voltage source into an AC voltage grid. The DC voltage source may be a battery, a fuel cell, a fuel cell stack or the like. Particularly, the DC voltage source may be a photovoltaic power generator. Despite the breakdown of the voltage provided by a photovoltaic power generator plant during the night, the topology of the inverter of the present invention allows for supplying the controller of the inverter out of the input voltage of the inverter. Due to the semiconductor switch of the normally off-type arranged in the one input line, no short circuit current flows between the input lines despite the normally conductive inverter bridge between the input lines, which would inhibit the build-up of a sufficient voltage between the input lines for supplying and starting the controller. Thus an input voltage which is sufficient for supplying the controller will build up in the morning.

As already mentioned at the beginning of this description, a DC/DC converter and a DC/AC converter or inverter of the present invention may be implemented in different surroundings and thus be integrated in various larger topologies as they are generally known to those skilled in the art. These topologies inter alia include those inverter topologies which are known as H4, H5, Heric, 3-Level, 5-Level and Gonzales as well as rectifiers for three-phase AC input voltages.

Now referring in greater detail to the drawings, a topology of a boost converter 48 depicted in FIG. 1 comprises two input lines 4 and 5 and an electric circuitry 40 connected to the input lines 4 and 5. The electric circuitry 40 includes a partial circuitry 38 connected between two input lines 4 and 5. In one embodiment, the partial circuitry 38 comprises a single semiconductor switch 52 which is of the normally on-type, i.e. conductive without application of a control voltage 42 to its gate 53. To nevertheless avoid a short circuit between the input lines 4 and 5 via the partial circuitry 38, a semiconductor switch 14 of the normally off-type, particularly a MOSFET, which is not conductive without application of a control voltage 41 to its gate 15 is arranged in the input line 5. This normally off semiconductor switch 14 is only switched on by the control voltage 41 from a controller 54, when the controller also applies a control voltage 42 to the gate 53 of the semiconductor switch 52. Without application of the control voltages 41 and 42 by the controller 54, the semiconductor switch 14 blocks any current between the input lines 4 and 5. To make use of the high blocking capability and particularly of the high blocking voltage resistance of the semiconductor switch 52 made as a SiC JFET here, a blocking potential line 55 branches from the input line 5 upstream of the semiconductor switch 14 to the gate 53 of the semiconductor switch 52. This blocking potential line 55 applies a blocking potential to the gate 53 as long as the semiconductor switch 14 blocks the input line 5 and thus conserves an input voltage applied between the input lines 4 and 5. Due to a resistor 56 provided in the blocking potential line 55, the blocking potential is only effective as long as the semiconductor switch 14 is off or not conductive. Any potential at the gate 53 due to the blocking potential line 55, which remains after closing the semiconductor switch 14 and which does not drop over the resistor 56, may easily be overridden in controlling the gate 53 of the semiconductor switch 52 with the control voltage 42. In the circuitry 40 according to FIG. 1 the semiconductor switch 52 of the normally on-type is directly controlled by the controller 54 with the control voltage 42 and may thus, for example, be used for a high frequency variation of the current flowing through the partial circuitry 38. The semiconductor switch 14 of the normally off-type is also controlled by the controller via the control signal 41. This, however, is not done at a higher frequency but with a constant control voltage 41 permanently applied to the gate 15 during the continuous operation of the boost converter 48 or as long as the partial circuitry 38 is controlled by the controller with the control voltage 42. For providing a boost function with regard to the input voltage applied between the input lines 4 and 5 on the left hand side in FIG. 1, the circuitry 40 comprises an inductor 49 and a diode 50. Further, there is an input buffer capacitor 6 and an output buffer capacitor 6. Besides the input buffer capacitor 6 connected to the input lines 4 and 5 upstream of the semiconductor switch 14, an additional capacitor 59 serving as a support capacitor is connected between the input lines 4 and 5 at a point between the semiconductor switch 14 of the normally off-type and the partial circuitry 38, i.e. in close proximity to the partial circuitry 38 comprising the semiconductor switch 52 of the normally on-type.

Figure 2:
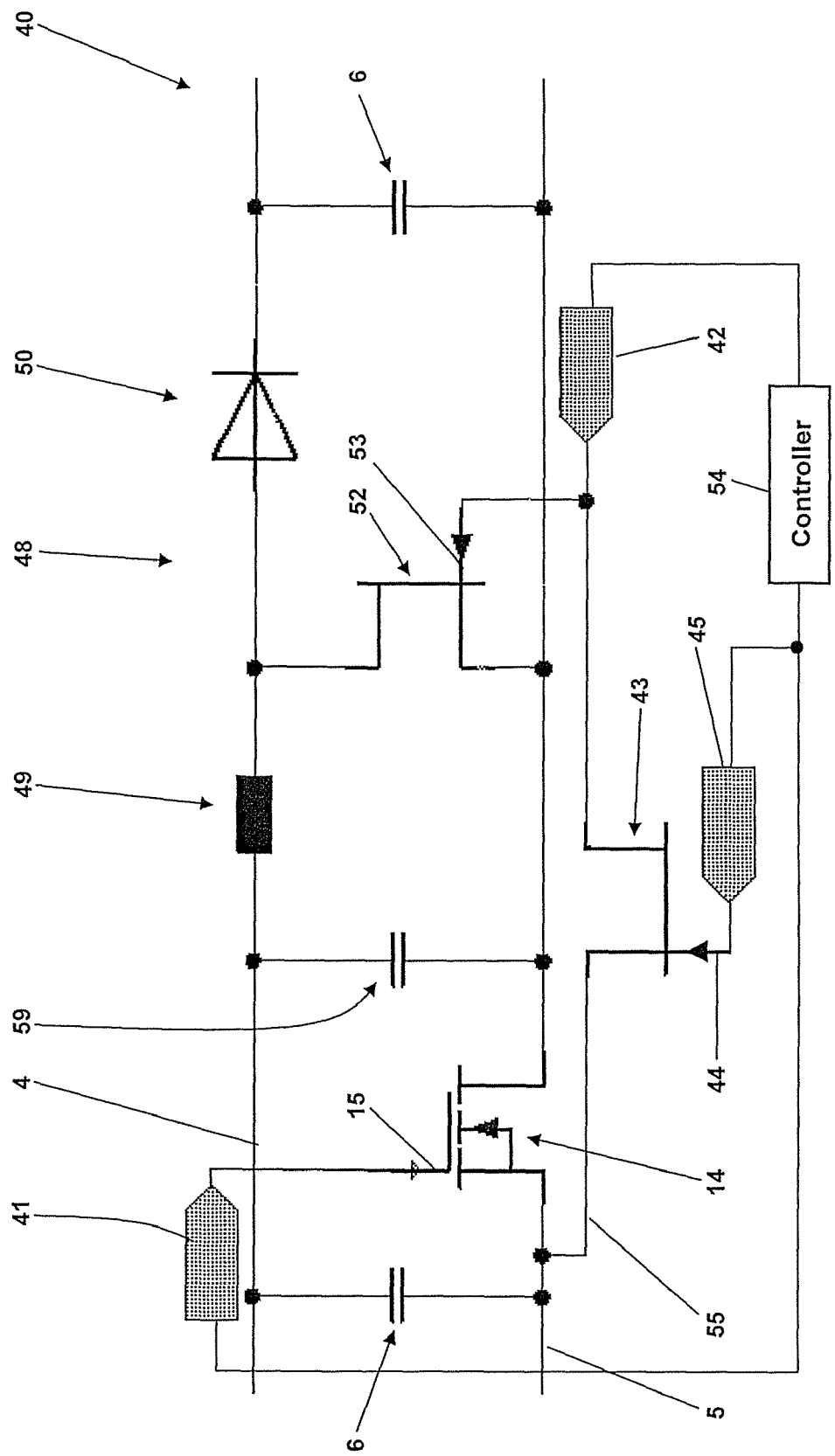
FIG. 2 shows a variant of the topology according to FIG. 1 with regard to a blocking potential line to the gate of the semiconductor switch of the normally on-type.

FIG. 2 shows a variant of the circuitry 40 according to FIG. 1. Here, instead of the resistor 56 according to FIG. 1, a semiconductor switch 43 of the normally on-type is provided in the blocking potential line 55, which is controlled by the controller 54 applying a control voltage 45 to its gate 44. As long as the controller 54 is not yet active, the blocking potential line 55 leads a blocking potential created by the semiconductor switch 14 of the normally off-type to the gate 53 of the semiconductor switch 52. When the controller is active, the semiconductor switch 43 is blocked or opened by the controller via the control voltage 45 and thus opens the blocking potential line 55. The control voltages 45 may be identical to the control voltage 41 for closing the semiconductor switch 14.

Figure 3:
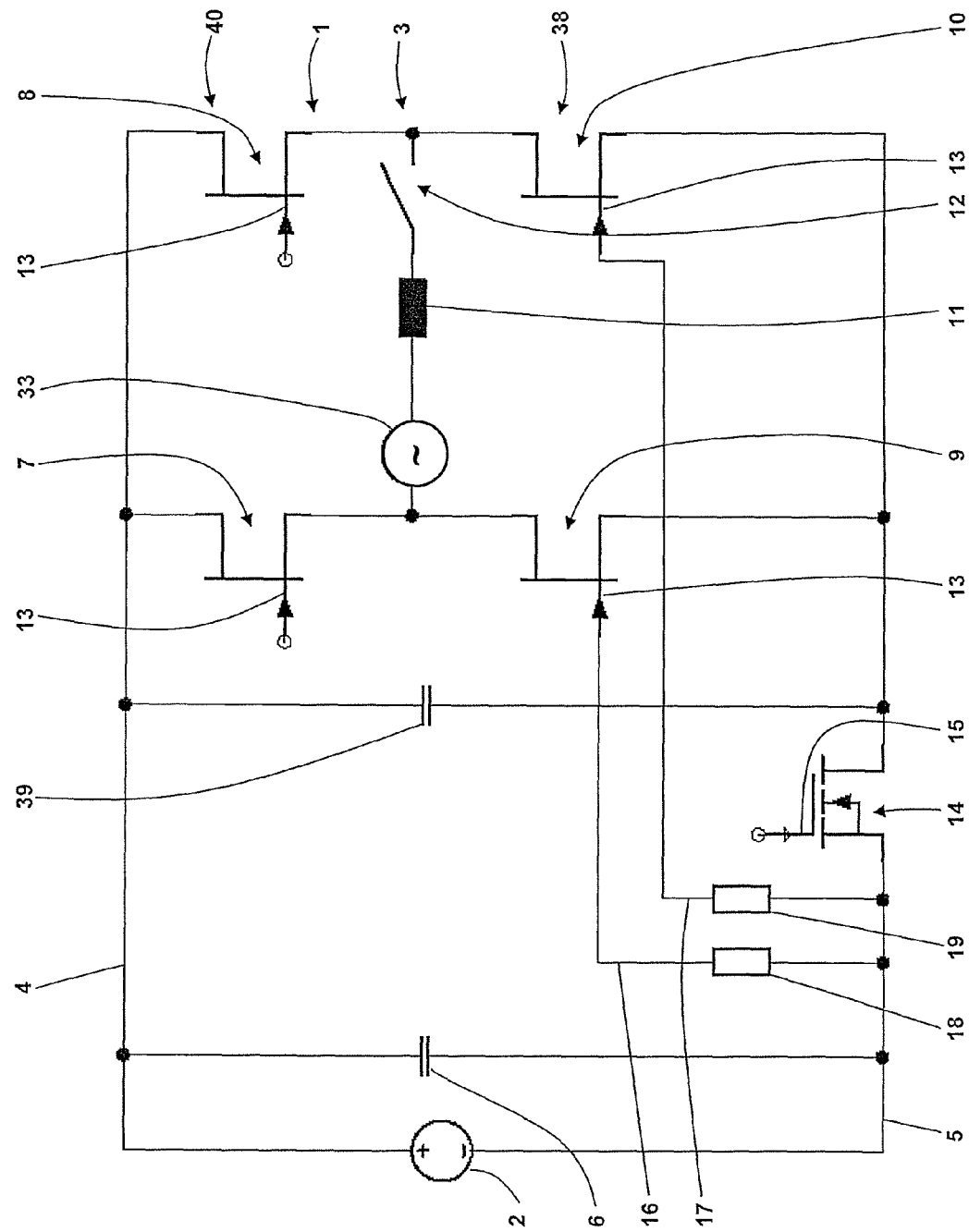
FIG. 3 shows a topology of a single-phase inverter which is of the normally off-type with regard to an input voltage present between its input lines.

FIG. 3 depicts the circuitry 40 of an inverter 1 which inverts a DC voltage of a DC voltage source 2 applied between the input lines 4 and 5 into an AC voltage at an AC output 33. The inverter 1 comprises a H-shaped inverter bridge 3 as the partial circuitry 38 connected between the input lines 4 and 5. The inverter bridge 3 includes four semiconductor switches 7 to 10 which are each connected to one of the input lines 4 and 5. An inductor 11 for smoothing the AC current output by the inverter bridge 3 and a contactor 12 for decoupling the AC output 33 from the inverter bridge 3 are provided in a cross branch of the H-shaped inverter bridge 3, in which the AC output 33 is located. All the semiconductor switches 7 to 10 of the inverter bridge 3 are SiC JFETs which are conductive without application of control voltages to their gates 13. Thus, the entire inverter bridge 3 is of the normally on-type. To nevertheless have an inverter 1 of the normally off-type, the normally off semiconductor switch 14 is arranged in the input line 5 following the same principles as in FIG. 1. The normally off semiconductor switch 14 is only then closed or turned on by the controller of the inverter 1, which is not depicted here, with a control voltage applied to its gate 15, when the controller also applies control voltages to the gates 13 of the semiconductor switches 7 to 10. Without such control voltages, the semiconductor switch 14 blocks the current flow to and via the inverter bridge 3. To make use of the high blocking capability and particularly of the high blocking voltage resistance of the SiC JFETs 9 and 10, two blocking potential lines 16 and 17 branch from the input line 5 upstream of the semiconductor switch 14 to the gates 13 of the semiconductor switches 9 and 10 here, and apply blocking potentials to the gates 13 as long as the semiconductor switch 14 blocks. For the purpose of these blocking potentials only being effective as long as the semiconductor switch 14 blocks, resistors 18 and 19 are provided in the blocking potential lines 16 and 17. The potentials remaining after closing the semiconductor switch 14 and not dropping over the resistors 18 and 19 are easily overridden by the control voltages applied by the controller in controlling the gates 13 of the semiconductor switches 9 and 10. The self-blocking property of the DC input side of the inverter 1 is not only effective during an initial build-up of the input voltage between the input lines 4 and 5, for example in the morning, if the DC voltage source 2 is a photovoltaic plant, but also in case of a sudden breakdown of the controller. In the latter case, the self-blocking property of the DC input side of the inverter 1 particularly avoids an uncontrolled short circuit current via the inverter bridge 3 driven by the large charges loaded on the buffer capacitor 6 which is connected in parallel to the inverter bridge for providing a buffer capacitance for the input voltage between the input lines 4 and 5. As the buffer capacitor 6 may be comparatively far away from the inverter bridge 3 in the inverter 1 according to FIG. 3, a further capacitor 39 serving as a support capacitor is connected in parallel to the inverter bridge 3 between the input lines 4 and 5 downstream of the semiconductor switch 14. This support capacitor 39 provides its capacitance close to the inverter bridge 3 to avoid high overvoltage peaks upon switching the semiconductor switches 7 to 10 of the inverter bridge 3. For this purpose, a comparatively small capacitance of the support capacitor 39 is sufficient, which typically is a hundredth or even less of the capacitance of the buffer capacitor 6.

Figure 4:
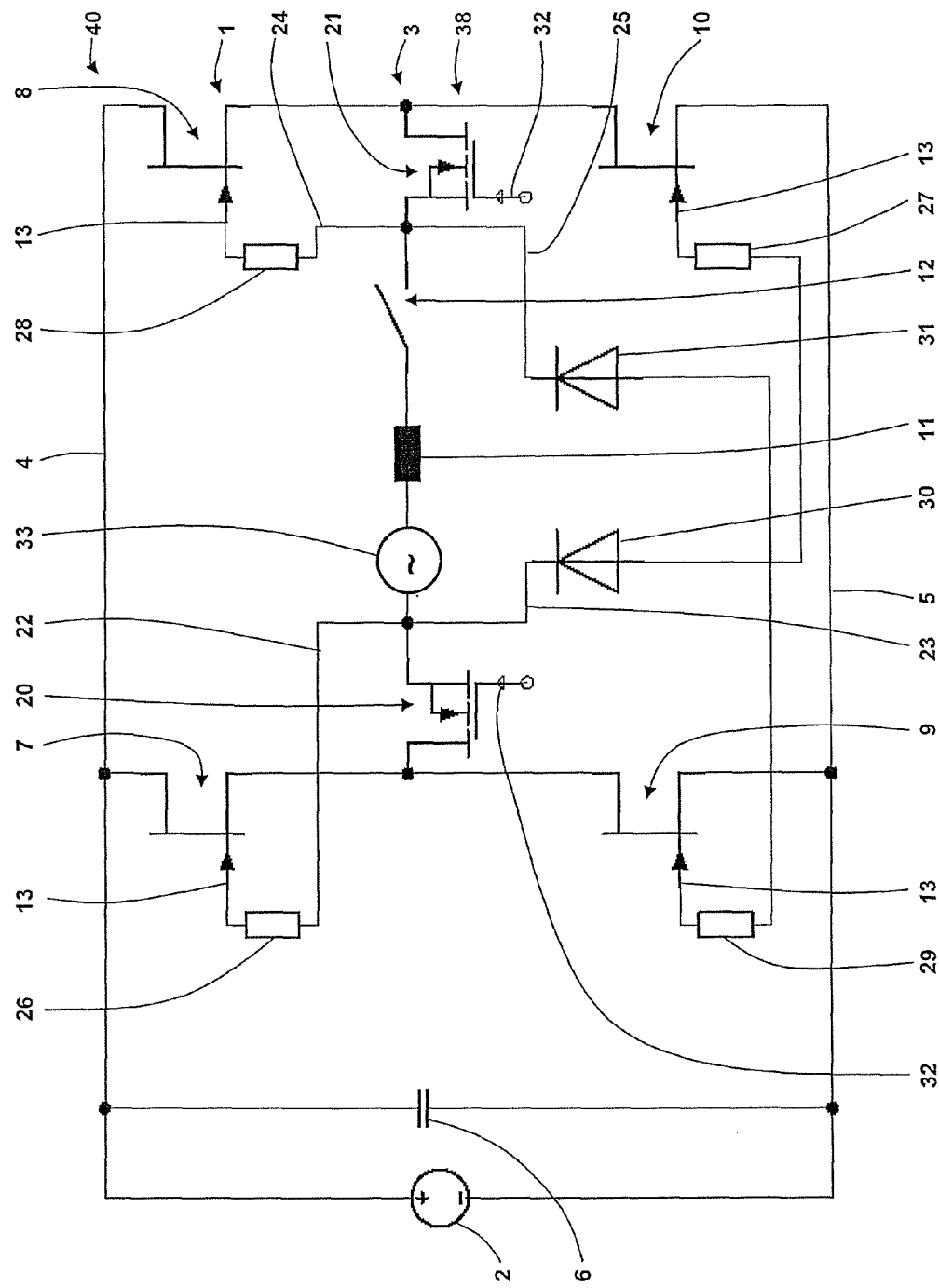
FIG. 4 shows a topology of an inverter which is of the normally off-type with regard to an external AC voltage present at an AC output.

FIG. 4 shows an inverter 1 in which a similar principle to that one in FIG. 3 is applied to provide a self-blocking property to the AC output side of the inverter, which avoids that an external AC voltage applied to the AC output 33 is shorted via the inverter bridge 3, if, for example, the contactor 12 and the controller controlling the semiconductor switches 7 to 10 simultaneously fail. For this purpose, two semiconductor switches 20 and 21 of the normally off-type are arranged in a mirror-symmetric arrangement with regard to the AC output 33 in the cross branch of the inverter bridge 3. Each of these semiconductor switches 20 and 21 is made as a MOSFET and blocks the external AC voltage in one direction. To also make use of the high blocking resistances of the SiC JFET 7 to 10 here, blocking potential lines 22 and 23, and 24 and 25, respectively, branch at points between the AC output 33 and the semiconductor switches 20 and 21, respectively, to the gates 13 of the diagonally arranged semiconductor switches 7 and 10, and 8 and 9, respectively. Resistors 26 to 29 are arranged in these blocking potential lines 22 to 25 to reduce the blocking potentials with closed or conductive semiconductor switches 20 and 21 in controlled operation of the inverter 1 so that they may be easily overridden in controlling the respective gate 13 by the controller of the inverter 1 (not depicted here). Additionally, blocking diodes 30 and 31 are provided in the blocking potential lines 23 and 25, which are not needed here but which are necessary in the combination of the embodiments of the inverters 1 of FIGS. 3 and 4 which is shown in FIG. 5.

Figure 5:
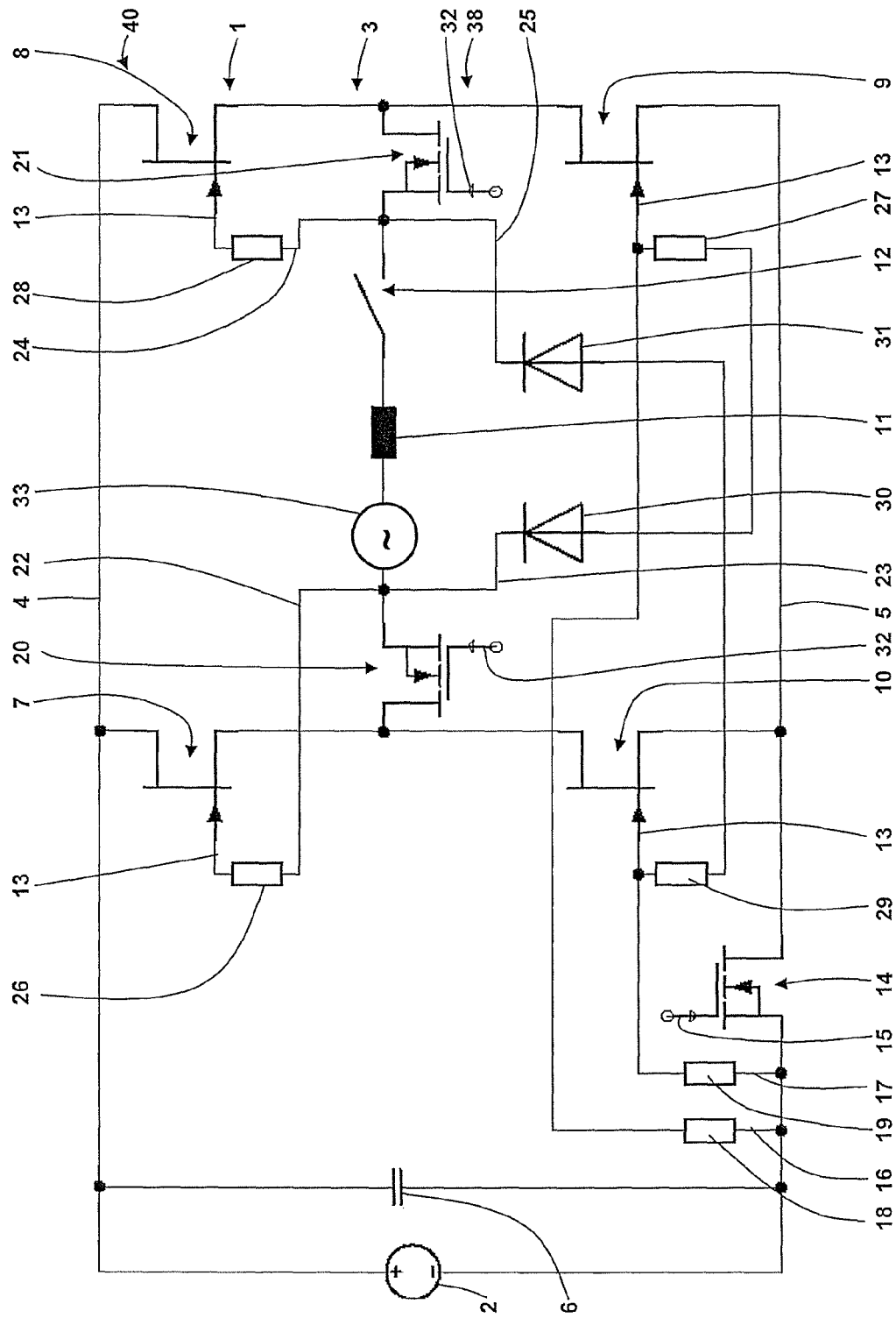
FIG. 5 shows a topology of an inverter which combines the measures for providing an inverter of the normally off-type according to FIGS. 3 and 4.

FIG. 5 shows a combination of the embodiments of the inverter 1 of FIGS. 3 and 4 except the capacitor 39 according to FIG. 3, which is omitted here for the sake of clarity but which could also be provided here. As a result, the inverter 1 according to FIG. 5 is self-blocking both with regard to a DC voltage between the input lines 4 and 5 and with regard to an external AC voltage applied at the AC output 33. Here, the blocking diodes 30 and 31 block currents which might otherwise—via the blocking potential lines 16 and 17, on the one hand, and the blocking potential lines 23 and 25, on the other hand, which are in pairs connected to the gates 13 of the semiconductor switches 9 and 10—flow between the input line 5 and the AC output 33.

It is appreciated that, in the inverters 1 according to FIGS. 3 to 5, each of the resistors 18, 19 and 26 to 29 provided in one of the blocking potential lines 16, 17 and 22 to 29, respectively, could be replaced by one normally on semiconductor switch 43 like that one provided in blocking potential line 16 of FIG. 2.

Figure 6:
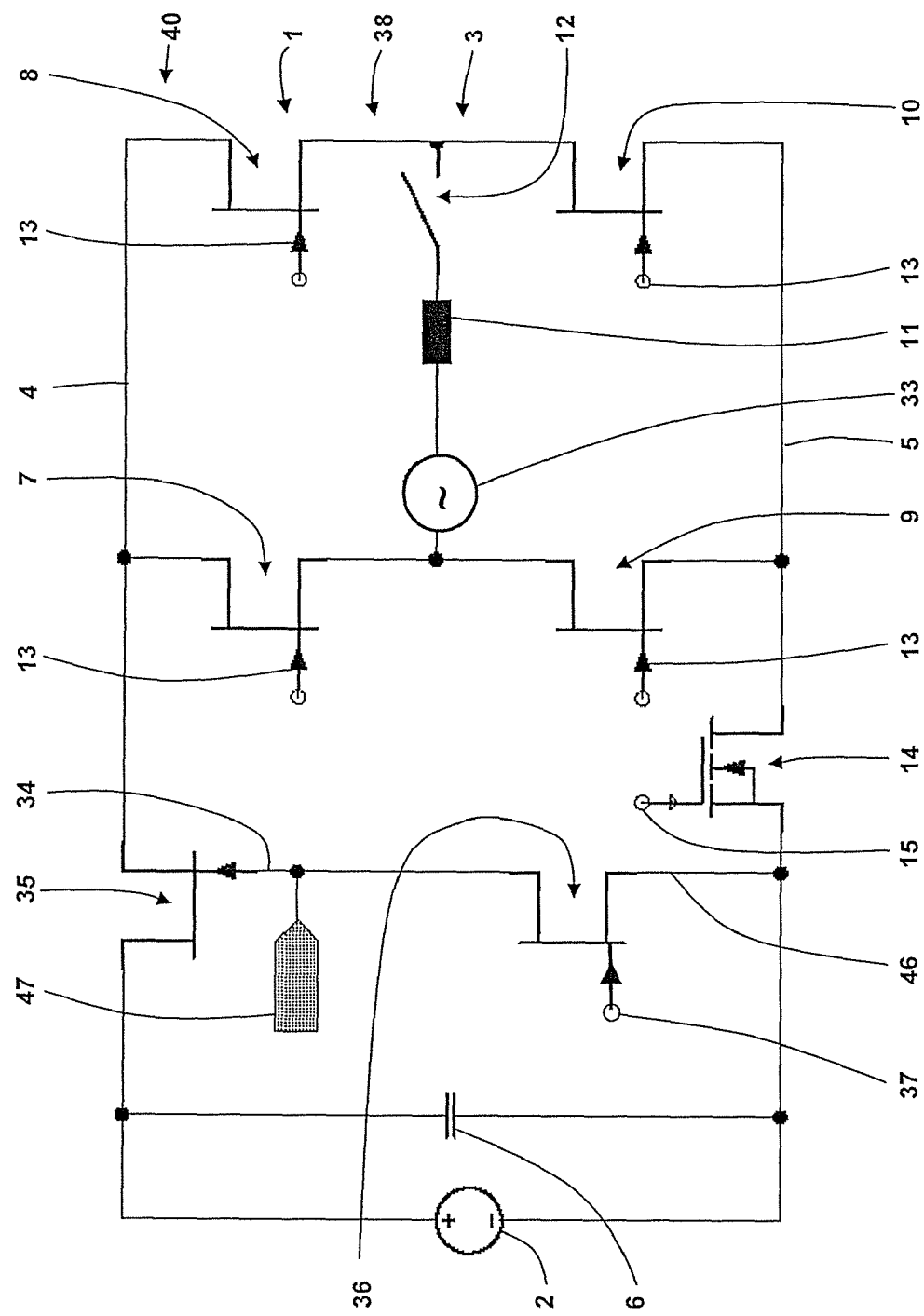
FIG. 6 shows a topology of a further inverter which is of the normally off-type both with regard to a DC voltage present at its input lines and an AC voltage present at its AC output, and which makes use of the teaching of DE 10 2004 030 912 B3 using SiC JFETs of the normally on-type as pulsed semiconductor switches.

FIG. 6 shows a modification of the inverter 1 according to FIG. 3 with regard to how to provide the self-blocking property with regard to the input DC voltage between the input lines 4 and 5. Here, the support capacitor 39 is again omitted for clarity sake, only. Instead of the two blocking potential lines 16 and 17 connected to the gates 13 of the semiconductor switches 9 and 10, only one blocking potential line 46 connected to a gate 34 of an additional normally on semiconductor switch 35 in the other input line 4 is provided here. Instead of a resistor, a further semiconductor switch 36 of the normally on-type is provided in this blocking potential line 46, to whose gate 37 the same control voltage is applied as to the gate 15 of the semiconductor switch 14, when the self-blocking property is no longer needed. In operation of the inverter 1, the additional semiconductor switch 35 and the semiconductor switches 9 and 10 may be operated by the controller (not depicted here) with control voltages 47 of high frequency, whereas the semiconductor switches 7 and 8 are operated by the controller at a lower frequency which corresponds to the AC voltage output at the AC output 33. In this way, the inverter 1 may realize the method known from US 2005/0286281 A1. Here, all normally on semiconductor switches 9 to 13 and 35 which are switching currents in operation of the inverter 1 are SiC JFETs. This will also apply to the semiconductor switch 36. Only the semiconductor switch 14 which, however, is not pulsed is a common MOSFET of the normally off-type. The temperature-sensitive common MOSFET semiconductor switch 14 may be spatially separated and thus thermally isolated from the temperature-insensitive SiC JFETs and completely optimized for a low conductive loss so that there is no relevant heat creation in its area. An inverter 1 of the present invention comprising a normally conductive inverter bridge 3 made of SiC JFETs displays both a high temperature resistance and a high efficiency at a comparatively low number of semiconductor parts.

Figure 7:
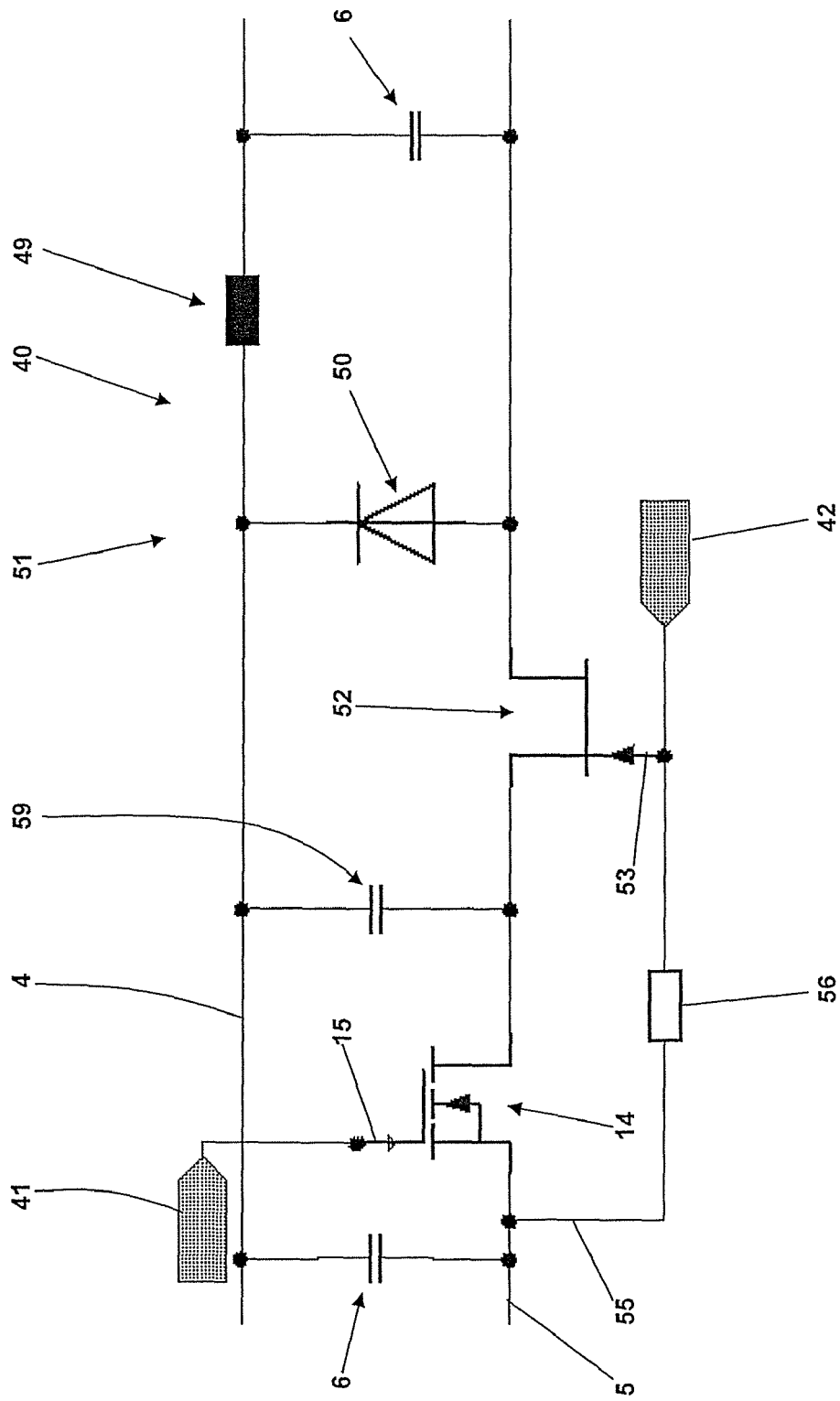
FIG. 7 shows a topology of a buck converter which has a semiconductor switch of the normally on-type and a semiconductor switch of the normally off-type spatially separated from the semiconductor switch of the normally on-type.

In a buck converter 51 whose circuitry 40 is depicted in FIG. 7, the combination of the semiconductor switch 52 of the normally on-type and the semiconductor switch 14 of the normally off-type arranged in the input line 5 generally corresponds to FIG. 1. In FIG. 7, however, the semiconductor switch 52 of the normally on-type is not arranged between the input lines 4 and 5 but also in the input line 5, i.e. downstream of the branching of the input line 5 towards the support capacitor 59. The support capacitor 59 has the effect that even then, when the semiconductor switch 52 cuts off the current through the input line 5, the current may flow on through the semiconductor switch 14 into the support capacitor 59. For providing a buck function, the circuitry 40 comprises the inductance 49 in the input line 4 and the diode 50 between the input lines 4 and 5 downstream of the semiconductor switch 52. Deviating from the standard circuitry of a buck converter, the pulsed switch in form of the semiconductor switch 52 is arranged in the other input line than the inductance 49, here.

Figure 8:
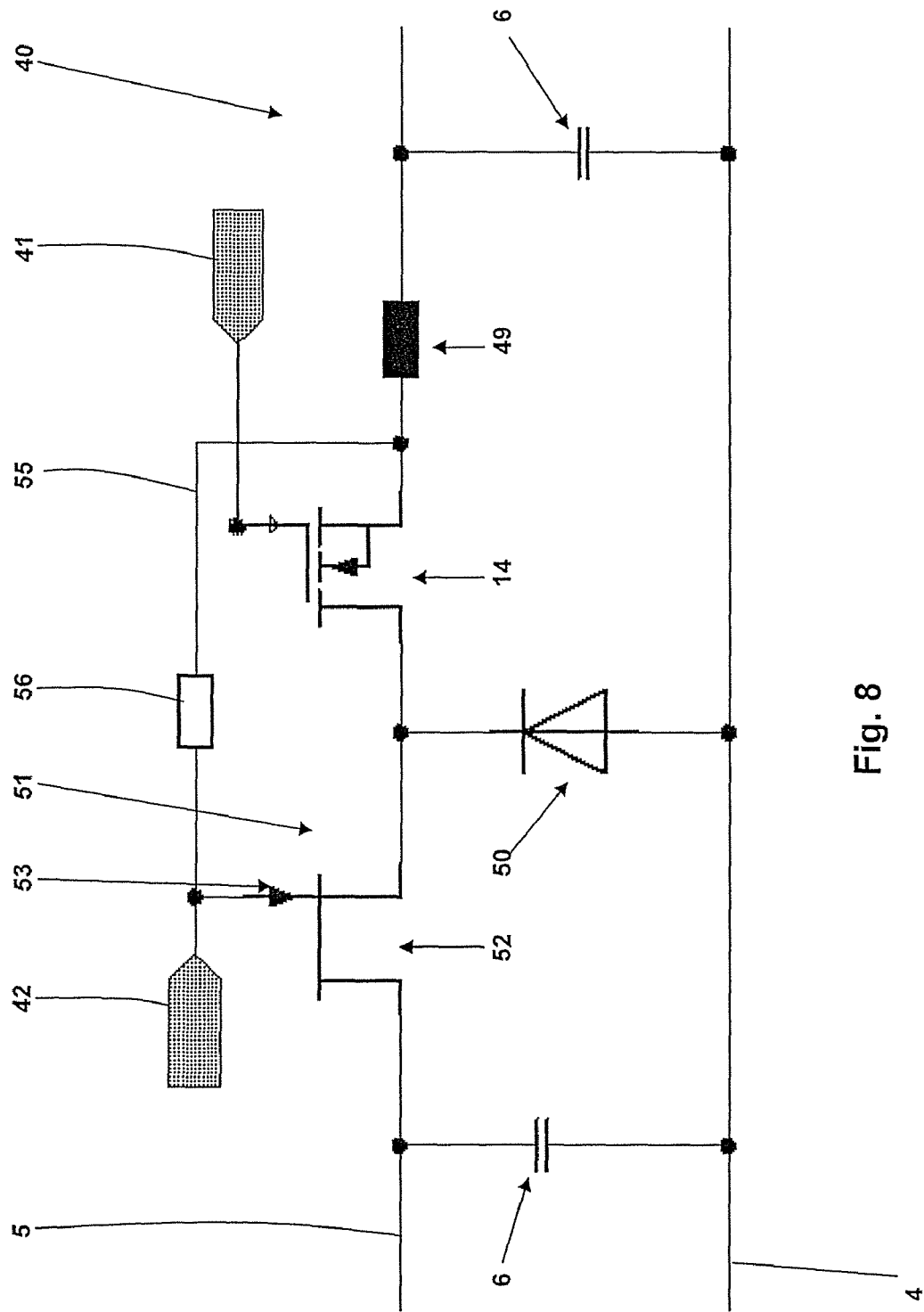
FIG. 8 shows a topology of another buck converter which has a semiconductor switch of the normally on-type and a semiconductor switch of the normally off-type spatially separated from the semiconductor switch of the normally on-type.

This is not the case in the circuitry 40 of the boost converter 51 depicted in FIG. 8. Here, the semiconductor switch 52 and the inductance 49 are both arranged in the input line 5. However, the semiconductor switch 14 of the normally off-type is arranged downstream of the semiconductor switch 52 of the normally on-type, i.e. between the semiconductor switch 52 of the normally on-type and the inductance 49 in the input line 5, here. In between, the input line 5 branches towards the diode 50 which is connected between the input lines 4 and 5. As a result, the blocking potential line 55 leading to the gate 53 of the semiconductor switch 52 of the normally on-type begins downstream of the semiconductor switch 14 of the normally off-type. In the buck converter 51 the current may also continuously flow through the semiconductor switch 14, either through the switch 52 or through the diode 50.

Figure 9:
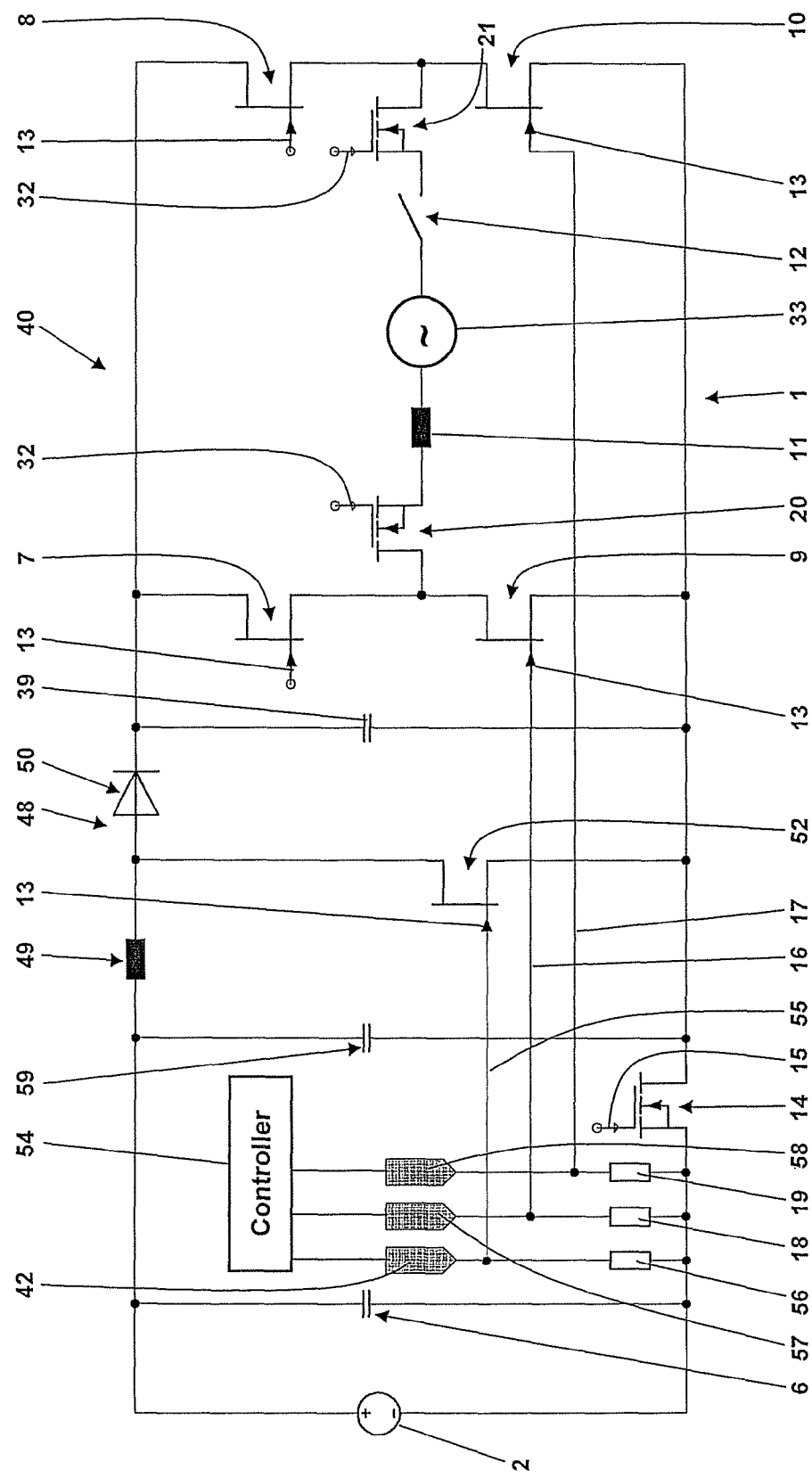
FIG. 9 shows a topology of an DC/AC converter including a boost converter according to FIG. 1 at its input end and an inverter similar to that one according to FIG. 3 at its output end.

The circuitry 40 of the DC/AC converter depicted in FIG. 9 includes a boost converter 48 according to FIG. 1 at its input end and an inverter 1 similar to that one according to FIG. 3 at its output end. In fact, the only deviation of the inverter 1 from that one according to FIG. 3 is that the inductor 11 is arranged at the other side and not at the same side of the AC output as the contactor 12. Further, the combination of the boost converter 48 and the inverter 1 only comprises one single common normally off semiconductor switch 14 in the input line 5 upstream of the support capacitor 59 of the boost converter 48. All blocking potential lines 16, 17 and 55 which lead to the gates 13 of the normally on semiconductor switches 9 and 10 of the inverter 1 and to the gate 53 of the normally on semiconductor switch 52 of the boost converter 48 branch off the input line 5 between the buffer capacitor 6 and the single normally off semiconductor switch 14. The resistors 18, 19 and 56 arranged in the blocking potential lines 16, 17 and 55 could again each be replaced by a normally on semiconductor switch 43 operated by the controller 54 according to FIG. 2. In FIG. 9 the control voltages 57 and 58 which are applied by the controller 54 to the gates 13 of the normally on semiconductor switches 9 and 10 of the inverter 1 and the control voltage 42 which are applied by the controller 54 to the gate 53 of the normally on semiconductor switch 52 of the boost converter 48 are all indicated as being applied downstream of the resistor 18, 19 or 56 in the blocking potential lines 16, 17 and 55, respectively.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A converter for converting a DC input voltage, the converter comprising:
   two input lines adapted to receive the DC input voltage;
   at least one normally off semiconductor switch which is not conductive without application of a first control voltage to its gate and which is provided in one of the input lines;
   an electric circuitry connected to the input lines and including at least one normally on semiconductor switch which is conductive without application of a second control voltage to its gate; and
   a controller which, in operation of the converter,
      operates the at least one normally on semiconductor switch of the electric circuitry by temporarily applying the second control voltage to its gate; and controls the at least one normally off semiconductor switch in the one input line by applying the first control voltage to its gate without switching it under load; wherein any normally on semiconductor switch of the electric circuitry, in operation of the converter, is operated by the controller by temporarily applying the second control voltage to its gate, and wherein any normally on semiconductor switch of the electric circuitry is spatially separated from any normally off semiconductor switch, thereby establishing a thermal isolation therebetween.

2. The converter of claim 1, wherein the controller, in operation of the converter, permanently applies the first control voltage to the gate of the at least one normally off semiconductor switch in the one input line.

3. The converter of claim 1, wherein the one input line in which the at least one normally off semiconductor switch is provided branches between the at least one normally off semiconductor switch in the one input line and the at least one normally on semiconductor switch of the electric circuitry.

4. The converter of claim 3, wherein the at least one normally off semiconductor switch in the one input line is arranged outside a free-wheeling current path of the converter.

5. The converter of claim 3, further comprising a buffer capacitor connected between the input lines upstream of the at least one normally off semiconductor switch in the one input line, and a further capacitor connected between the input lines downstream of the at least one normally off semiconductor switch in the one input line.

6. The converter of claim 5, wherein the further capacitor has a capacitance that is less than a hundredth of a capacitance of the buffer capacitor.

7. The converter of claim 3, wherein the at least one normally on semiconductor switch of the electric circuitry is part of a normally conductive partial circuitry connected between the input lines.

8. The converter of claim 7, further comprising at least one blocking potential line extending from the one input line upstream of the at least one normally off semiconductor switch to each gate of a selection of all normally on semiconductor switches of the partial circuitry, and wherein the selection is selected in such a way that application of a blocking potential to each gate of the selection makes the entire partial circuitry not conductive between the input lines.

9. The converter of claim 8, wherein a resistor is provided in each blocking potential line.

10. The converter of claim 8, wherein a normally on semiconductor switch which is conductive without application of a control voltage to its gate is provided in each blocking potential line, wherein the controller, in operation of the converter, permanently applies a control voltage to the gate of the normally on semiconductor switch in the blocking line for deactivation thereof.

11. The converter of claim 7, wherein the partial circuitry is a normally conductive inverter bridge comprising at least one inverter half bridge including two normally on semiconductor switches.

12. The converter of claim 11, further comprising at least one blocking potential line extending from the one input line upstream of the at least one normally off semiconductor switch to the gate of at least one normally on semiconductor switch per half bridge of the inverter bridge, wherein all of these at least one normally on semiconductor switches per half bridge of the inverter bridge are all connected to a same one of the input lines.

13. The converter of claim 11, wherein the controller operates a semiconductor switch which is provided in one of the input lines as well as those normally on semiconductor switches of the inverter bridge which are connected to the other of the input lines at a high frequency, whereas it operates those normally on semiconductor switches of the inverter bridge connected to the one input line at a lower frequency of an AC voltage output by the inverter bridge.

14. The converter of claim 13, wherein the semiconductor switch in the one of the input lines is a further normally on semiconductor switch which is conductive without application of a control voltage to its gate.

15. The converter of claim 11, wherein the inverter bridge comprises two inverter half-bridges, and an AC output is provided in a cross branch between the half-bridges that form an H-shaped inverter bridge, wherein two normally off semiconductor switches which are not conductive without application of a control voltage to their gates are arranged in a mirror-symmetric arrangement with regard to the AC output in the cross branch, and wherein the controller, in operation of the converter, permanently applies a control voltage to the gates of the two normally off semiconductor switches in the cross branch to turn such switches on.

16. The converter of claim 15, further comprising two blocking potential lines extending from each side of the AC output to the gates of one of two pairs of diagonally arranged semiconductor switches of the normally on-type of the inverter bridge.

17. The converter of claim 16, further comprising a resistor provided in each blocking potential line.

18. The converter of claim 16, further comprising a normally on semiconductor switch which is conductive without application of a control voltage to its gate provided in each blocking potential line, wherein the controller, in operation of the converter, permanently applies a control voltage to the gate of the at least one normally on semiconductor switch in the blocking line to turn such switches off.

19. The converter of claim 16, further comprising blocking diodes provided in the blocking potential lines extending from between the AC output and each one of the normally off semiconductor switches in the cross branch to a node connected to the one input line upstream of the normally off semiconductor switch in the one input line via another blocking potential line.

20. The converter of claim 7, wherein the at least all normally on semiconductor switches of the partial circuitry comprise SiC type switch devices.

21. The converter of claim 20, wherein all the normally on semiconductor switches of the partial circuitry comprise SiC field effect transistors.

22. The converter of claim 20, wherein all the normally on semiconductor switches of the partial circuitry comprise SiC JFETs.

23. A converter for converting a DC input voltage, the converter comprising:
two input lines adapted to receive the DC input voltage;
at least one normally off semiconductor switch which is not conductive without application of a first control voltage to its gate provided in one of the input lines;
an electric circuitry connected to the input lines and including at least one normally on semiconductor switch which is conductive without application of a second control voltage to its gate; and
a controller which, in operation of the converter,
operates the at least one normally on semiconductor switch of the electric circuitry by temporarily applying the second control voltage to its gate; and permanently applies the first control voltage to the gate of the at least one normally off semiconductor switch in the one input line;

wherein the one input line in which the at least one normally off semiconductor switch is provided branches at a point between the at least one normally off semiconductor switch in the one input line and the at least one normally on semiconductor switch of the electric circuitry, wherein a buffer capacitor is connected between the input lines upstream of the at least one normally off semiconductor switch in the one input line, and wherein a further capacitor is connected between the input lines downstream of the at least one normally off semiconductor switch and upstream of the electric circuitry.

24. The converter of claim 23, wherein the further capacitor has a capacitance that is less than a hundredth of a capacitance of the buffer capacitor.

25. The converter of claim 23, wherein the at least one normally off semiconductor switch in the one input line is arranged outside a free-wheeling current path of the converter.

26. A converter for converting a DC input voltage, the converter comprising:
two input lines adapted to receive the DC input voltage;
at least one normally off semiconductor switch which is not conductive without application of a first control voltage to its gate provided in one of the input lines;
a partial electric circuitry connected between the input lines and including at least one normally on semiconductor switch which is conductive without application of a second control voltage to its gate; and
a controller which, in operation of the converter, operates the at least one normally on semiconductor switch of the partial electric circuitry by temporarily applying the second control voltage to its gate; and
permanently applies the first control voltage to the gate of the at least one normally off semiconductor switch in the one input line;
wherein the partial electric circuitry is normally conductive between the input lines without application of the second control voltage to the gate of the at least one normally on semiconductor switch, and
a blocking potential line extending from the one input line upstream of the at least one normally off semiconductor switch to the gate of the at least one normally on semiconductor switches of the partial circuitry.

27. The converter of claim 26, further comprising a resistor provided in the blocking potential line.

28. The converter of claim 26, further comprising a further normally on semiconductor switch which is conductive without application of a control voltage to its gate provided in the blocking potential line, wherein the controller, in operation of the converter, permanently applies a control voltage to the gate of the normally on semiconductor switch in the blocking line to turn the switch off.

29. An inverter for converting a DC input voltage, the inverter comprising:
two input lines adapted to receive the DC input voltage;
a normally conductive H-shaped inverter bridge comprising an AC output in a cross branch between two inverter half bridges of the inverter bridge, each inverter half bridge including two normally on semiconductor switches which are conductive without application of a first control voltage to their gates;
two normally off semiconductor switches which are not conductive without application of a second control voltage to their gates in a mirror-symmetric arrangement with regard to the AC output in the cross branch of the H-shaped inverter bridge; and
a controller which, in operation of the inverter, operates the normally on semiconductor switches of the inverter bridge by temporarily applying first control voltages to their gates; and
permanently applies first control voltages to the gates of the two normally off semiconductor switches in the cross branch of the H-shaped inverter bridge.

30. The inverter of claim 29, further comprising two blocking potential lines extending from each side of the AC output to the gates of one of two pairs of diagonally arranged semiconductor switches of the normally on-type of the inverter bridge.

31. The inverter of claim 30, further comprising a resistor provided in each blocking potential line.

32. The inverter of claim 30, further comprising a normally on semiconductor switch which is conductive without application of a control voltage to its gate provided in each blocking potential line, wherein the controller, in operation of the inverter, permanently applies a control voltage to the gate of the at least one normally on semiconductor switch in the blocking line to turn the switch off.

33. The inverter of claim 29, further comprising a normally off semiconductor switch which is not conductive without application of a control voltage to its gate provided in one of the input lines; and wherein the a controller, in operation of the inverter, permanently applies control voltages to the gates of the normally off semiconductor switch in the one input line to keep the switch on.

34. The inverter of claim 33, further comprising at least one blocking potential line extending from the one input line upstream of the normally off semiconductor switch to the gate of at least one normally on semiconductor switch per half bridge of the inverter bridge, wherein all of the at least one normally on semiconductor switches per half bridge of the inverter bridge are all connected to a same one of the input lines.

35. The inverter of claim 34, further comprising a resistor provided in each blocking potential line.

36. The inverter of claim 34, further comprising a normally on semiconductor switch which is conductive without application of a control voltage to its gate provided in each blocking potential line, wherein the controller, in operation of the inverter, permanently applies a control voltage to the gate of the normally on semiconductor switch in the blocking line to turn the switch off.

37. The inverter of claim 36, further comprising two blocking potential lines extending from each side of the AC output to the gates of one of two pairs of diagonally arranged semiconductor switches of the normally on-type of the inverter bridge; and wherein blocking diodes are provided in the blocking potential lines extending from between the AC output and each one of the normally off semiconductor switches in the cross branch to a node connected to the one input line upstream of the normally off semiconductor switch in the one input line via another blocking potential line.

38. The inverter of claim 29, wherein the controller operates a semiconductor switch which is provided in one of the input lines as well as those normally on semiconductor switches of the inverter bridge which are connected to the other of the input lines at a high frequency, whereas it operates those normally on semiconductor switches of the inverter bridge connected to the one input line at a lower frequency of an AC voltage output by the inverter bridge.

39. The inverter of claim 38, wherein the semiconductor switch in the one of the input lines is a further normally on semiconductor switch which is conductive without application of a control voltage to its gate.

40. The inverter of claim 39, wherein any normally on semiconductor switches of the electric circuitry which, in operation of the inverter, are operated by the controller by temporarily applying a control voltage to its gate are spatially separated from any normally off semiconductor switch, thereby providing thermal isolation therebetween.

41. The inverter of claim 29, wherein the normally on semiconductor switches of the inverter bridge comprise SiC JFETs.

42. A method of operating an inverter, which comprises two input lines adapted to receive a DC input voltage and a normally conductive inverter bridge comprising two inverter half bridges each including two normally on semiconductor switches which are conductive without application of a control voltage to their gates, and an AC output formed from nodes of the two half bridges, for feeding electric energy from a photovoltaic DC power generator into an AC power grid, the method comprising the steps of:
  connecting the photovoltaic DC power generator to the input lines;
  connecting the AC output to the AC power grid;
  providing a normally off semiconductor switch which is not conductive without application of a control voltage to its gate in one of the input lines;
  providing two normally off semiconductor switches which are not conductive without application of a control voltage to their gates in a mirror-symmetric arrangement with regard to the AC output in the cross branch of the H-shaped inverter bridge at the nodes of the two half bridges; and
  when the DC power generator supplies the DC input voltage, feeding a controller with electric energy so that the controller:
    operates the normally on semiconductor switches of the inverter bridge by temporarily applying first control voltages to their gates; and
    permanently applies second control voltages to the gates of the normally off semiconductor switch in the one input line and to the gates of the two normally off semiconductor switches in the cross branch of the H-shaped inverter bridge.

43. A DC/AC converter, comprising:
  a boost converter, comprising:
    two input lines configured to receive a DC input voltage;
    electric circuitry connected to the input lines, and comprising a normally on semiconductor switch that is configured to be conductive without application of a first control voltage to a gate thereof;
    a normally off semiconductor switch provided in one of the input lines, wherein the normally off semiconductor switch is configured to not conduct without application of a second control voltage to a gate thereof;
    a controller configured, in operation of the DC/AC converter, to drive the normally on semiconductor switch by selectively applying the first control signal to its gate, and drive the normally off semiconductor switch by constantly applying the second control signal to its gate,
  an inverter operatively coupled to an output of the boost converter, comprising:
    a full H-bridge circuit comprising four normally on semiconductor switches that form two inverter half bridges having cross branch outputs forming AC output terminals;
    blocking potential lines coupled between the controller and gate terminals of two normally on semiconductor switches that operate as sinking devices of the full H-bridge circuit, wherein the controller is configured to turn off the sinking devices when the normally off semiconductor switch is deactivated.

44. The DC/AC converter of claim 43, wherein the full H-bridge circuit further comprises:
  two additional normally off semiconductor switches in a mirror arrangement, each coupled between a connecting node of two normally on semiconductor switches in one of the inverter half bridges and an AC output terminal, respectively,
  wherein the controller is configured to constantly apply the second control signal or a signal analogous thereto to the two additional normally off semiconductor switches during operation of the DC/AC converter, thereby turning such switches on.

45. The DC/AC converter of claim 43, wherein the normally, off semiconductor switch and the normally on semiconductor switches are thermally isolated from one another.

* * * * *